United States Patent [19]

Salerno et al.

[11] 4,227,195
[45] Oct. 7, 1980

[54] FUZE

[75] Inventors: James Salerno, Rockville; Fabian T. Liss, Bethesda, both of Md.; Frank Weiss, Washington, D.C.

[73] Assignee: The United States of America as represented by the Secretary of the Army, Washington, D.C.

[21] Appl. No.: 311,609

[22] Filed: Sep. 19, 1963

[51] Int. Cl.³ .............. G01S 13/10; G01S 13/52; H03B 11/00
[52] U.S. Cl. .................. 343/17.1 R; 343/7.7; 343/13 R; 331/165
[58] Field of Search ............... 331/165, 166, 173, 174; 307/88.5-88.11, 88.5 ED; 343/100.7, 7.7, 17.1, 13 R

[56] References Cited

U.S. PATENT DOCUMENTS 3,060,364 10/1962 Holcomb .............................. 331/165
3,168,654 2/1965 Lewis .............................. 307/88.5 ED Primary Examiner—Malcolm F. Hubler
Attorney, Agent, or Firm—Nathan Edelberg; Robert P. Gibson; Saul Elbaum

[57] ABSTRACT

1. A radar signal code generator comprising:
  a. first oscillator means comprising an output terminal for producing, at said terminal, a continuous sigusoidal wave having a continuously varying frequency; and
  b. pulse generator means operatively connected to said first oscillator means output terminal for producing a plurality of pulses, each of which consists of a constant frequency carrier wave, the initiation of each of said pulses occurring at a predetermined time interval after a respective cycle of said sinusoidal wave from said first oscillator means reaches a selected phase value.

6 Claims, 8 Drawing Figures

FUZE

The invention described herein may be manufactured and used by or for the Government of the United States of America for governmental purposes without the payment to us of any royalty thereon.

This invention relates to the field of distance measuring devices and more particularly to range measuring systems.

Of the many techniques used for obtaining target distance information, there is one in which an electromagnetic signal is radiated in the direction of the target and its reflections therefrom are detected. A portion of the transmitted signal is delayed by a fixed amount within the system and combined with the returning signal. When the time delay between transmission of the radiated signal and reception of its reflection is equal to the time delay introduced to the portion of the transmitted signal which is internally delayed, the correlation produces a maximum output which would indicate that the target is at a preselected distance. These systems generally transmit a succession of constant frequency carrier wave pulses which have a constant pulse repetition frequency.

Such systems function reasonably well, but provide small signals owing to the fact that the pulses only exist during a small portion of each pulse repetition period, causing the system to have a low duty cycle. Further, attempts to increase the duty cycle in such systems by increasing the pulse width result in degraded range resolutions, while attempts to increase the duty cycle by increasing the pulse repetition frequency cause range ambiguities.

It is therefore an object of this invention to obtain a high resolution target distance indication in a pulse system which is nonambiguous over an extremely large range and which has a duty cycle approaching 100%.

It is another object of this invention to improve the range resolution of such distance measuring systems.

It is yet another object of this invention to obtain accurate distance indications while reducing the countermeasures vulnerability of the system.

It is still another object of this invention to obtain a highly accurate range indicating system occupying very little space and having low weight.

It is still another object of this invention to produce a novel radar signal capable of affording high range resolutions.

Another object of this invention is to produce said novel signal utilizing simple and highly reliable circuitry.

The present invention produces heretofore unobtainable target range resolution and system reliability with a system having extremely low weight and space requirements. These results are achieved through the use of a novel type of signal coding which is produced in a novel pulse modulated signal generator.

The novel operation of the present device results from the application of a pulse phase shift code to a pulse train, each pulse unit of which consists of a carrier wave having a constant frequency which is much higher than the basic digital unit repetition rate. This coded signal is transmitted by the system in the direction of the target and is reflected from any object in its path. The reflection is detected by a receiver which forms an integral part of the system. The time between transmission of the signal into space and reception of its reflection by the receiver is, of course, directly proportional to the distance between the system and the object causing reflection. A portion of the transmitted signal is internally delayed within the system for a preselected time interval which is equal to the time between radiation into space and reception of the reflected signal for a target object which is at the desired range. The received signal is then combined with the internally delayed portion of the transmitted signal in such a manner as to obtain the cross-correlation product of the two signals. Since the internally delayed portion of the transmitted signal is delayed by an interval equal to the transit time between transmission and reception of a radiated signal when the target is at a desired distance from the system, it will have maximum correlation with the received signal when the target, or reflecting surface, is at the desired range.

The present invention utilizes a novel form of coding which results in a signal having exceptional correlation properties. The most notable of these properties are high range resolution, substantially zero correlation for all target ranges other than the desired one, a duty cycle approaching 100%, and no range ambiguity over the operating range of the device. The invention also features a novel signal generator which is capable of generating the above-mentioned code and which is reliable and relatively simple. It should also be noted that the novel coding technique makes the system extremely invulnerable to electronic countermeasures, or jamming.

These and other objects, advantages, and features of the present invention will become more readily apparent from references to the following discussion taken in connection with the drawings, in which.

The novel code used in the practice of this invention will now be discussed in detail. The nature of the correlation produced with this code will then be discussed and will be followed by a description of the novel signal generator used herein. A preferred system capable of performing the desired range measurement will then be described.

PULSE PHASE SHIFT CODE

The signal code with which the present invention is able to achieve its improved operation is known as a "pulse phase shift code." This code consists of a succession of pulses of a sinusoidal carrier wave, the frequency of the carrier wave being of the order of ten times as great as the repetition frequency of the pulses. In the present device a mean pulse repetition frequency of 50 mc and a carrier wave frequency of 500 mc have been used successfully. Each pulse has the same carrier wave starting phase so that the phase of the carrier wave train of any one pulse with respect to the phase of the carrier wave of the previous pulse depends on the pulse repetition frequency. Thus, if the pulse repetition frequency is 50 mc and the carrier wave frequency is 500 mc the time between the initiation of one pulse and the initiation of the succeeding pulse will be exactly equal to the period of ten whole cycles of the carrier wave, so that, if we consider two signals which have a phase difference of 360° times any integer as being in phase, the carrier wave in each pulse will be exactly in phase with that of the preceeding pulse. Further, if the pulse repetition rate is increased or decreased slightly the phase of the carrier wave of a particular pulse will be caused to, respectively, lead or lag the phase of the carrier wave of the immediately preceeding pulse. Of course, other ratios of pulse frequency to carrier wave frequency may be used.

Figure 1:
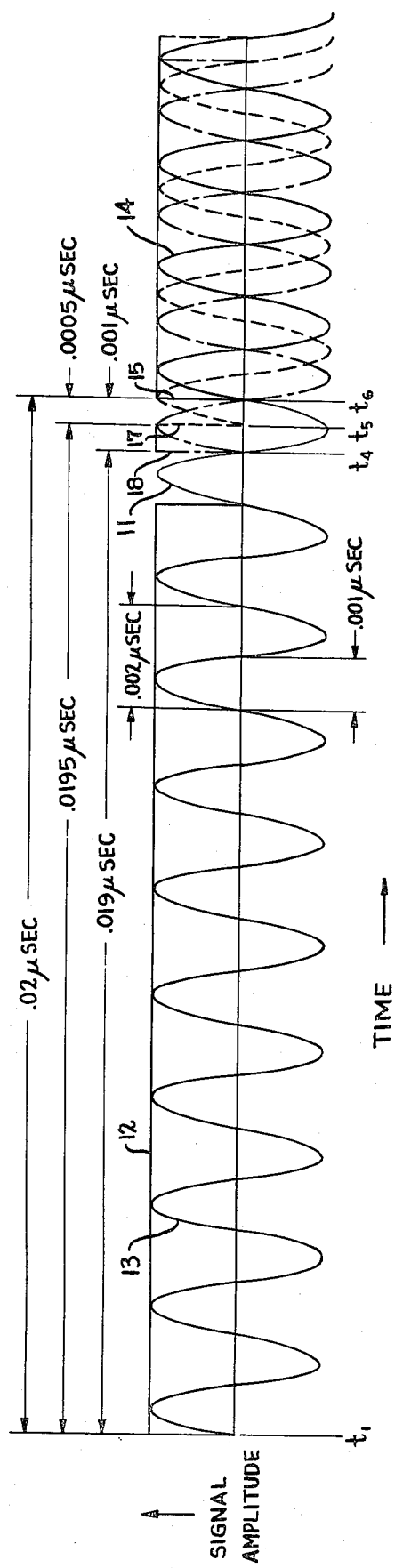
FIG. 1 is a graph representing the waveform of a portion of the generated signal.

The phase relation between the carrier waves of succeeding pulses for varying pulse repetition rates is illustrated in FIG. 1. In this figure the line 12 represents the envelope and the line 13 represents the carrier wave of an arbitrary pulse. The sinusoidal curve 11 is a reference wave which is in phase with the wave 13 but which does not appear in the system of the present invention. The vertical line 15 represents the instant of initiation of the immediately succeeding pulse for a pulse repetition frequency of 50 mc. Since the carrier wave is at a frequency of 500 mc the time elapsed between the initiation of the two pulses is exactly equal to the time required for ten cycles of the carrier wave. This means that the carrier 14 of the second pulse will be in phase with the carrier wave 13 of the first pulse. It is clear from the figure if the pulse repetition rate were to be increased the time between the initiation of the first pulse 13 and the succeeding pulse 14 will be decreased so that the carrier wave 14 would be initiated at an earlier time with respect to the wave 13. This would cause the phase of the wave 14 to advance with respect to the continuous reference wave 11. Since the period of one cycle of the carrier wave is equal to 2 nanoseconds ($2 \times 10^{-9}$ sec), a decrease in the pulse repetition period of one nanosecond would cause the time of initiation of the carrier wave 14 to advance from the time $t_6$ to the time $t_4$, so that its phase is shifted by 180° with respect to the reference signal 11. Similarly, the wave 14 will be initiated at the point $t_5$, corresponding to a phase advance of 90° when the pulse repetition period is decreased by 0.5 nanoseconds. The phase of the wave 14 can also be made to lag the phase of the reference wave 11 by increasing the pulse repetition period.

When the time between succeeding pulses is equal to the period of a whole number of cycles of the carrier wave, in this case 10 cycles, the carrier waves are in phase and are said to be at zero phase with respect to each other. When a slight decrease in the pulse period occurs, causing an advance in the time of initiation of a second carrier wave with respect to its immediately preceding wave, the phase of the second carrier wave is said to lead the phase of the first carrier wave by an amount equal to the phase shift of the second carrier wave with respect to its zero phase condition. Similarly, an increase in the pulse repetition period will cause the carrier wave of the second pulse to lag in phase with respect to the phase of the carrier wave of the first pulse.

Figure 2:
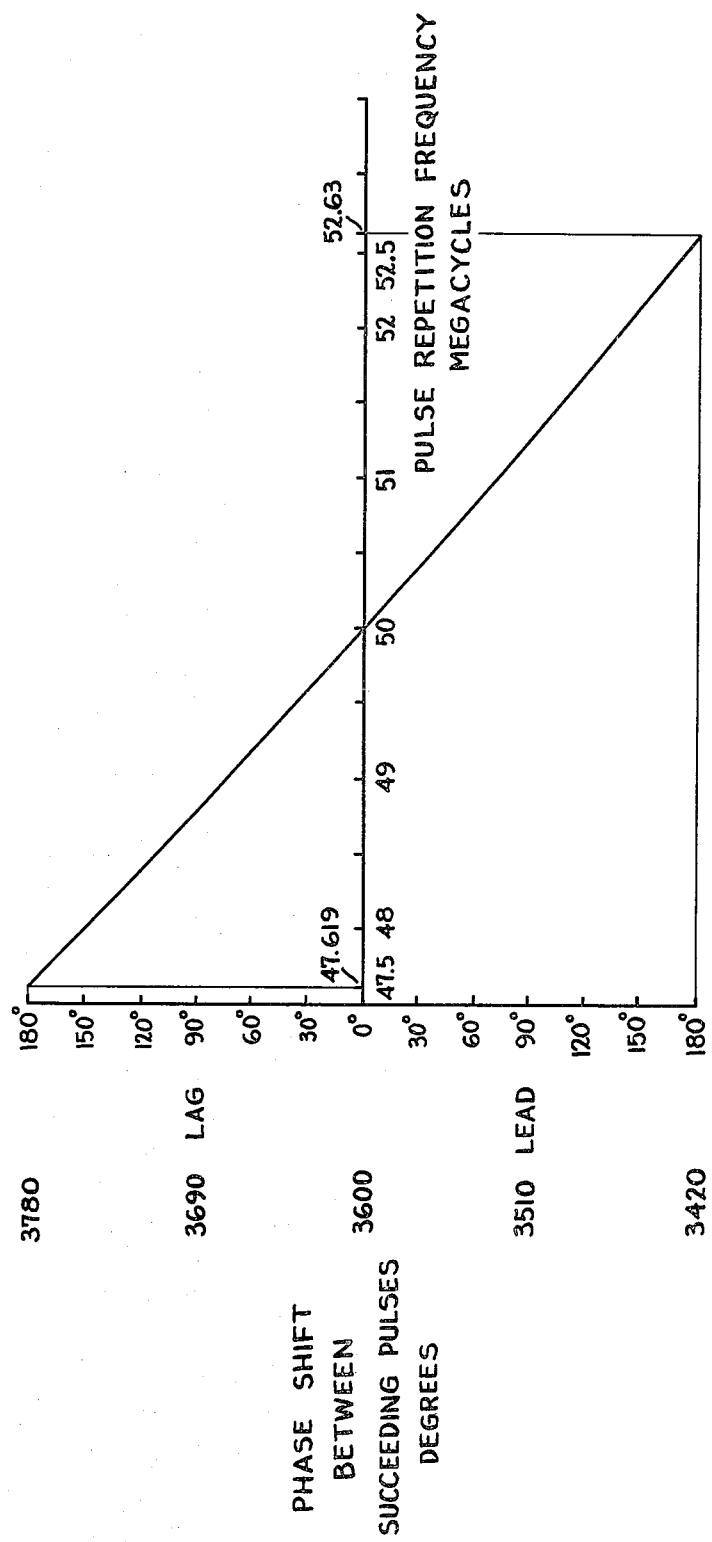
FIG. 2 is a graph representing the phase shift properties of the present signal generator.

FIG. 2 is a graph illustrating the phase shift occurring between the carrier wave of succeeding pulses for various pulse repetition frequencies. The first scale on the ordinate of the graph is graduated in the number of actual degrees of phase occurring between the initiation of the carrier wave for one pulse and the initiation of the carrier wave for the immediately succeeding pulse for a 500 mc carrier wave and a mean pulse repetition rate of 50 mc. Thus, when the pulse repetition frequency is exactly 50 mc the time between the initiation of succeeding pulses is equal to the period of 10 cycles or 3600° of the carrier wave. The second scale on the ordinate is graduated in degrees of phase shift of the carrier wave of the succeeding pulse with respect to the phase of this carrier wave at a pulse repetition frequency of 50 mc. The curve of FIG. 2 is obtained from the equation:

$$\phi(\text{degrees}) = (360°) f_c t \tag{1}$$

where $f_c$ equals the carrier frequency in mc and t equals the time, in microseconds, between pulses. Since t equals $1/f_m$, where $f_m$ is the pulse repetition frequency in mc, equation (1) may be rewritten as:

$$\phi = (360°) f_c / f_m. \tag{2}$$

Equation (2) produces an indication of total phase shift occurring between the initiation of one pulse and the initiation of the immediately succeeding pulse. In order to obtain an indication of the phase shift of the carrier wave of each succeeding pulse with respect to its zero phase position it is only necessary to subtract 3600° from the right side of the equation so that the equation for the curve of FIG. 2 with respect to the second scale on the ordinate will be:

$$\phi = (360°) f_c / f_m - 3600° \tag{3}$$

As may be seen from the above equations the curve of FIG. 2 is a section of a hyperbola. However, for the range of values of phase shift of FIG. 2 the line approximates a straight line, since the rate of change of phase between succeeding pulses at the extremities of the curve varies from that at the zero relative phase shift position by the order of only 10%.

The device of the present invention mechanizes the relation shown in FIG. 2 by generating a succession of such pulses, the repetition rate of which is linearly varied between approximately 47.5 mc and 52.5 mc. This results in a succession of carrier wave pulses with the phase of each pulse carrier wave varying from a phase lag of approximately 180° with respect to the immediately preceeding carrier wave at a pulse repetition frequency of approximately 47.5 mc through a zero phase lag at a 50 mc pulse repetition frequency to a phase lead of 180° at a pulse repetition-frequency of approximately 52.5 mc. The pulse repetition frequency is varied so that it alternately increases and decreases in a linear manner, resulting in a waveform of pulse repetition rate vs. time which is triangular in nature. This wave form has a much lower frequency than the mean pulse repetition rate, being of the order of 10 or 20 kilocycles, and is referred to herein as the "pulse rate variation" or the "pulse repetition rate variation." This variation and the frequency deviation may be adjusted to any values, depending upon the type of code and the amount of phase advance desired.

THE CORRELATION PROPERTIES OF THE DIGITAL PHASE SHIFT CODE

The novel code described above, when used in a correlation type radar system, is capable of providing a highly accurate indication when a target object is at a preselected range. In such a system a portion of the coded signal is internally delayed for a fixed time interval, with the delayed version being used as one input to a correlator. The system radiates the aforementioned coded signal in the direction of the potential target. When the radiated waves strike any object a portion of their energy is reflected back toward the system where it is received and conducted to the second input of the correlator. Thus, the signal derived from the receiver is identical in form to the internally delayed reference signal, but is not necessarily identical in amplitude or time of occurrence.

The correlator functions to mix two input signals, integrate the resulting difference signal over a time period of many cycles of pulse rate variation, and derive the time average of this integral. As will be seen from the following description of the wave-form of FIG. 3, the signal produced at the output of the correlator will have a sharp maximum when the target is at the desired range. The desired range is selected by varying the delay applied to the reference signal in such a manner that this delay will be equal to the time required, when the target is at the desired range, for the signal radiated by the system to travel to the target and be reflected back to the receiver.

Figure 3B:
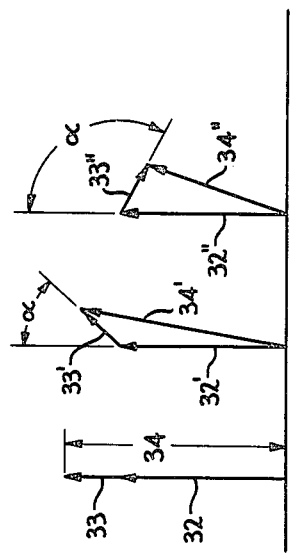
FIGS. 3a and 3b show a series of vector diagrams of correlator inputs.
Figure 3A:
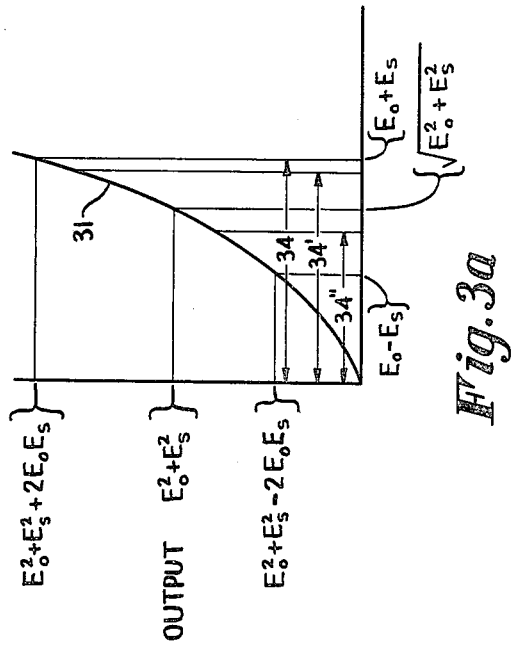

FIG. 3a illustrates the voltage-current characteristic of the mixer used in the preferred embodiment of this device. The mixer used could be the crystal diode type such as that shown in FIG. 16-22 on page 578 of Terman, Electronic and Radio Engineering (1955), with the tank circuit shown in that figure being removed. The received radar signal represents the RF signal and the internally delayed reference signal represents the local oscillator signal of FIGS. 16-22. The parameters of the diode and its associated circuitry are chosen so that the mixer output is responsive to the pulse repetition frequency but not to the carrier wave frequency. Therefore, the output of the crystal diode mixer will be proportional to the peak amplitude of the vector sum of the two input signals for each pulse period.

FIG. 3b illustrates the relation between the vectors of the two input signals for three different values of phase angle $\alpha$. The resultant vectors are shown as 34, 34' and 34" and their relation to the amplitudes of the maximum and minimum correlator inputs are indicated in FIG. 3a. FIG. 3a shows mixer input voltage along its abscissa and mixer output current along its ordinate.

When two signals of equal frequency are added the amplitude of the envelope of the resultant signal is equal to:

$$\sqrt{E_s^2 + E_o^2 + 2E_s E_o \cos \alpha} \quad (4)$$

However, as is indicated in FIG. 3a, the characteristic of the crystal diode is parabolic in nature so that the output current is proportional to the square of the input voltage. This means that the output signal will be proportional to:

$$E_s^2 + E_o^2 + 2e_o E_s \cos \alpha \quad (5)$$

If a DC blocking capacitor were placed in series with the diode output the component of the output signal represented by $(E_s^2 + E_o^2)$ would not appear beyond this capacitor since it is an unvarying quantity, when the peak amplitudes of the inputs are constant. The series combination will conduct a signal component only when $\alpha$ is varying with time and this component will be proportional to $2E_o E_s \cos \alpha$.

The phase angle between the two mixer inputs will experience a time variation caused by two mutually exclusive, but concurrent, phenomena: the doppler phase shift of the received signal due to changing target range, and pulse-to-pulse phase variation due to the pulse phase shift code. As will become clear from the following discussion, the phase shift due to doppler has a negligible effect on the phase variation of the mixer output whenever the pulse phase shift code is producing a pulse-to-pulse phase variation. However, when any portion of the mixer output pulses are not undergoing such pulse-to-pulse variation the changing target range will cause the output amplitude to vary at the doppler frequency. This latter situation exists when the time delay between the two mixer input signals is less than one pulse period; in short, when the target range is close to the desired value.

Figure 4:
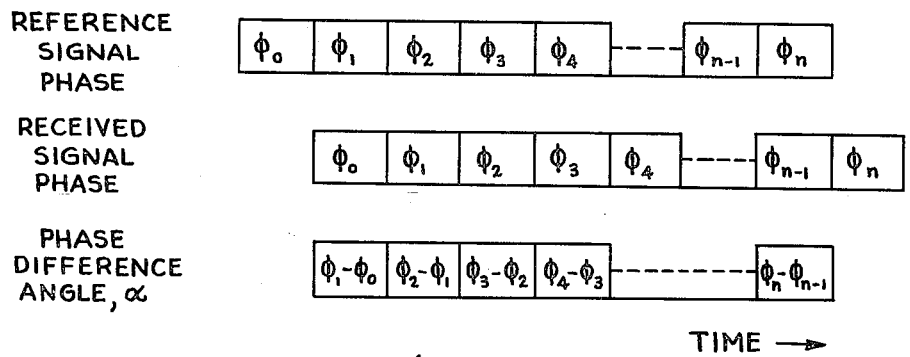
FIG. 4 shows groups of phase diagrams used to describe the operation of the correlator of the present invention.

Referring now to the case where all of the mixer output signals have a pulse-to-pulse phase variation, which exists when the delay between the two correlator inputs is equal to the mean signal pulse repetition period, a given pulse of the received signals will be combined in the mixer with the next succeeding pulse of the reference signal. This situation is illustrated in FIG. 4, where the phase of each pulse with respect to its immediately succeeding pulse is indicated by subscripts on the associated phase angle symbols ($\phi$). Since each correlator input pulse derived from the receiver has the same phase as the immediately preceding reference signal pulse, the phase difference between the carrier waves of any simultaneously occurring pair of mixer input pulses will be equal to that existing between the carrier waves of that reference signal input pulse and the immediately preceding reference input pulse. As has been previously noted the phase difference existing between the carrier wave of each reference signal pulse and its immediately preceding pulse carrier wave depends on the instantaneous pulse repetition frequency. As the pulse repetition frequency varies the phase difference between the carrier waves of succeeding adjacent signal pulses shifts from minus 180° through zero degrees to 180° and back through zero degrees to minus 180°. Therefore, the same variation is occurring in the phase angle existing between the carrier waves of simultaneously occurring pairs of mixer input pulses. This relation is illustrated in the bottom graph of FIG. 4.

Figure 5:
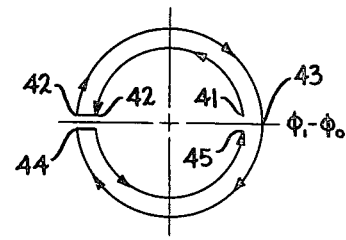
FIG. 5 is a phase diagram of the instantaneous values of the signals appearing at the product output of the correlator of the present invention.

Since the mixer output signal will be proportional to the cosine of the phase angle between the carrier waves of the two input signals, the nature of the output signal over one cycle of signal pulse repetition rate variation can be illustrated by a phase diagram such as that shown in FIG. 5. In this figure the reference phase is chosen to be the phase difference between the carrier waves of the reference signal pulses $\phi_1$ and $\phi_o$. Each of the circles of the figure represent signals having identical amplitudes and are shown to have different sizes only for purposes of clarity. As the phase difference between the carrier waves of succeeding simultaneously occurring pairs of mixer input signals increases from the reference phase to 180°, the phase angle associated with the mixer output signal gradually advances from the point 41 to the point 42. As this phase difference then proceeds from 180° to −180°, the phase angle shifts from the point 42 around the outer circle through the point 43 to the point 44. Variation of the phase difference from −180° back to the reference phase difference causes the resultant phase to shift from the point 44 around the inner circle to the point 45. The phase circle of FIG. 5 is actually taken with reference to a vector representing the phase of the mixer reference signal input but that vector is not shown because it may appear at any arbitrary angle with respect to the reference phase of the figure. It is immaterial what the actual value of this phase difference is since all phase differences over a range of 360° are equally represented.

As may be seen from FIG. 5, the result of the mixing operation over one cycle of pulse rate variation, when DC blocking is employed, will be equivalent of two cycles of a wave having equal positive and negative portions.

If the received signal were to be delayed by an amount equal to two signal pulse periods, the resulting mixer output signal could be represented by a balanced phase diagram representing four complete rotations of the received signal carrier wave phase for each cycle of signal pulse rate variation. Additional incremental increases in the received signal time delay will result in similar balanced phase diagrams having increased numbers of complete rotations of the phase difference vector.

If the time delay between the reference signal pulses and the received signal pulses is equal to any whole number of pulse periods plus some fractional portion of one period, the first portion of each received signal pulse will mix with a particular reference signal pulse and the remainder of that received signal pulse will mix with the immediately succeeding reference signal pulse. It should be obvious that the mixing of the first portions of all of the received signal pulses can be represented by one balanced phase diagram and the mixing of the remaining portions of all of the received signal pulses can be represented by a second balanced phase diagram. Therefore, whenever the time delay of the received signal with respect to the reference signal of any duration is greater than one pulse period, the AC portion of the mixer output will have equal positive and negative segments over each cycle of pulse rate variation.

When the time delay between the received signal mixer input and the reference signal mixer input is less than one pulse period the leading portion of each received signal pulse mixes with the trailing portion of its corresponding reference signal mixer input pulse and the trailing portion of each received signal mixer input pulse mixes with the leading edge of the next succeeding reference signal input pulse, so that the mixing of all of these latter portions of the received signal pulses produces a balanced phase diagram. However, although some phase difference may exist between the leading portion of a particular received signal input pulse and its corresponding reference signal mixer input pulse, this phase difference will be constant for each pulse. For example, if the signal produced by the system of this invention were to have the values shown in FIG. 1, and a time delay of one quarter of a pulse period were to exist between the received signal mixer input and the reference signal mixer input the leading portion of the received signal mixer input pulse $\phi_o$ of FIG. 4 which mixes with the reference signal mixer input $\phi_o$ would have a 180° phase difference with respect to reference signal mixer input $\phi_o$ as would the leading portion of the received signal mixer input $\phi_1$ with respect to reference signal mixer input $\phi_1$, etc. Thus, when the time delay between the two mixer input signals is less than one pulse period, the mixer output signal has a component which varies in response to the duration of the time delay and which is not balanced out over one cycle of pulse repetition rate variation. Inspection of FIG. 3a will show that this component will be a maximum when the carrier waves of the two mixer input signals are in phase and will be a minimum when the carrier waves are anti-phase. Furthermore, as the time delay approaches zero, the duration of this component will increase since the fraction of each received signal mixer input pulse that mixes with its corresponding reference input signal mixer input pulse will increase, causing an increase in the average correlation product.

It should be noted that even when a pulse-to-pulse phase variation exists in the mixer output, the received signal carrier wave may go through some doppler phase shift due to relative target movement. However, since the target radial velocity will remain constant over one cycle of digital pulse rate variation, each received pulse carrier wave will experience the same amount of phase shift with respect to the particular local oscillator pulse with which it mixes. Therefore, a balanced phase signal component will continue to be produced at the mixer output whenever the time delay between its two input signals is such that at least a portion of the mixer output experiences a phase shift from pulse to pulse; so that the theory of operation of this code is unaffected by such doppler phase shifts. Moreover, with the pulse rate and carrier frequency magnitudes herein described, a target closing rate as high as 25,000 mph will produce a phase shift in the received signal carrier wave of only 0.25° during one pulse period.

Since the rate of change of the phase difference between the carrier waves of the reference signal mixer input pulse and the received signal input pulse is dependent on the rate of closure of the target range, the signal produced at the mixer output when the time delay between the two mixer input pulses approaches zero is in the nature of a Doppler signal. Obviously when the time delay is zero this signal is a maximum since each portion of the received signal mixer input is exactly in phase with each portion of the reference signal mixer input.

There has thus been described a code which, when used with the mixer described, produces a mixer output which varies in a sinusoidal manner at one frequency, which is some integral multiple of the signal pulse repetition rate variation, and which varies at a second frequency, the Doppler frequency, when the time delay between the two mixer input signal is less than one pulse period. It will be seen in the subsequent discussion that there exists a wide range of frequency values for the radar signal parameters which can be used in system that is capable of distinguishing between these two potential mixer output frequency ranges.

PULSE PHASE SHIFT CODE SIGNAL GENERATOR

Despite the great advantages accruing to the use of the above described code, it would not be possible to construct a device capable of generating this code while having the qualities of reliability, simplicity and compactness were it not for the novel pulse phase shift signal generator originated by us.

Figure 6:
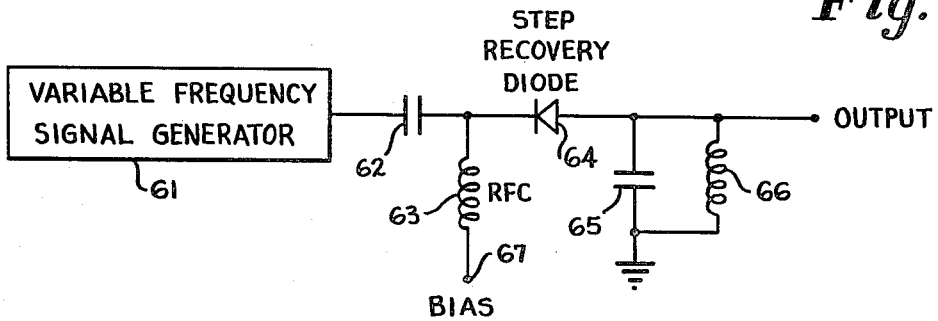
FIG. 6 is a schematic diagram of the preferred embodiment of signal generator of the present invention.

FIG. 6 shows a schematic diagram of this generator. Generator 61 contains a variable frequency sine wave generator capable of having its frequency continuously varied between 47.5 mc and 52.5 mc. In practice, satisfactory results have been obtained when a frequency variation rate of 10 or 20 kilocycles has been used. The generator 61 may be of any well-known type. For example, it may consist of a 10 kilocycle triangular wave generator driving a voltage variable oscillator. Such a circuit is shown in Terman, Electronic and Radio Engineering (1955) pp. 600–601. The output of oscillator 61 is connected through a dc blocking capacitor 62 to the input of a "step-recovery" diode 64. A bias voltage may be applied at terminal 67 through choke 63 to vary the voltage level of the diode 64.

The action of "step-recovery" diode has been described by Boff in "Linear Amplification and Generation", 1960 International Solid State Circuit Conference, Philadelphia, Pa. It has also been described in Moll, Proceeding IRE, volume 50, pp. 43–53, January 1962. This type of diode conducts current in the forward direction in the normal fashion. When the polarity of the applied voltage is reversed, a reverse current will flow because of finite carrier lifetime. This current will continue flowing until all the minority carriers are depleted, at which time current ceases flowing. With this type of diode, the current can fall from some peak value to zero in a small fraction of a nanosecond. The time between the reversal of polarity of the signal to the diode and the abrupt cutoff is determined mainly by the characteristics of the diode junction and the amplitude of the signal generator output. Since the amplitude of this generator output will be maintained at a constant value the time between the reversal of polarity and diode cutoff will be constant for each cycle of the sine wave of generator 61. While the diode is conducting in a reverse direction energy is being stored in the tank circuit comprised of capacitor 65 and inductor 66. When the abrupt current cut-off occurs in diode 64 this tank circuit will begin oscillating at its resonant frequency. The resonant frequency of the tank circuit is chosen to be equal to the desired pulse carrier wave frequency, in this case, 500 mc. Such a tank circuit has been manufactured from a microstrip line foreshortened by a piston-type capacitor. The tank circuit will always begin oscillating with the same initial phase. Furthermore, the same interval always exists between the instant at which the signal produced by generator 61 changes polarity and the instant of diode cutoff so that the time between the start of succeeding tank circuit carrier wave oscillations will be exactly equal to the period of the generator 61. It should therefore be obvious that the output of the tank circuit is a series of carrier wave groups, or pulses, each of which is shifted in phase with respect to the immediately preceding pulse by an amount determined by the frequency of the output of generator 61. Thus, a signal is produced having a continuously varying phase difference between succeeding pulses, which is precisely the signal described in the preceding sections herein.

The actual signal is damped by antenna loading, but this distortion does not alter the principal of operation and merely narrows the correlator output.

A COMPLETE RANGE MEASURING SYSTEM

Figure 7:
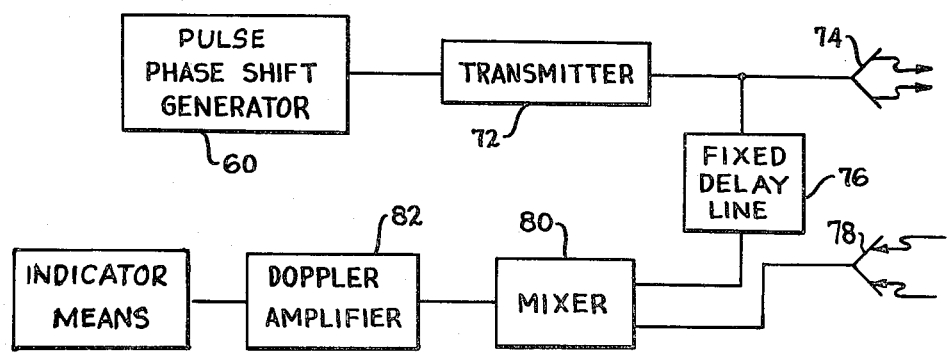
FIG. 7 is a block diagram of a preferred form of range measuring system embodying the principals of the present invention.

A system incorporating the above described generator and operating according to the principles already discussed will now be described in connection with the block diagram of FIG. 7. The pulse phase shift generator 60 is identical with the circuit shown in FIG. 6 and has its output connected to a transmitter 72. The transmitter is optional since the output power from the generator is sufficient for many applications. This transmitter may be of any well-known type which is designed to suitably amplify the output of the generator 60 and to conduct this output to a transmitting antenna 74. A portion of the output of transmitter 72 is connected to the input of a fixed delay line 76 which serves to produce the reference signal input to mixer 80. As has been discussed above, the amount of the delay is determined by the desired target range. Any signals radiated by antenna 74, and reflected from some object in the radiation field will be received by antenna 78 and will be conducted as the second input to mixer 80. The mixer 80 serves the function of the multiplier previously described. The output of this mixer is fed to an amplifier 82 which is designed to be sensitive to doppler frequency signals. Such an amplifier performs the correlator integration function. Since doppler frequencies of an order of 1 kc will be encountered in a target closing situation, there will be ten cycles of pulse frequency variation rate of 50,000 digital pulses, for each cycle of doppler frequency. There is thus provided an adequate time average integration in the doppler amplifier 82. It should be noted that the signal generator of the present invention is subject to many modifications without departing from the scope of this invention. For example, the pulse repetition frequency variation could be modulated by a noise source having its frequency center at 50 mc. It should also be noted that the specific frequency values referred to above are only representative of one set of values which could be utilized with this system. In practice, carrier frequencies of up to 800 mc with digital switching rates of 100 mc have been successfully used.

It will be apparent that the embodiments shown are only exemplary and that various modifications can be made in construction and arrangement within the scope of the invention as defined in the appended claims.

We claim as our invention:

1. A radar signal code generator comprising:
  a. first oscillator means comprising an output terminal for producing, at said terminal, a continuous sinusoidal wave having a continuously varying frequency; and
  b. pulse generator means operatively connected to said first oscillator means output terminal for producing a plurality of pulses, each of which consists of a constant frequency carrier wave, the initiation of each of said pulses occurring at a predetermined time interval after a respective cycle of said sinusoidal wave from said first oscillator means reaches a selected phase value.

2. A radar signal code generator comprising:
  a. a first oscillator for generating a first signal;
  b. a second oscillator which is frequency variable and having a control input which is operatively connected to said first oscillator in such a manner that the frequency of the output of said second oscillator is dependant on the instantaneous amplitude of said first signal; and
  c. pulse generator means for producing a series of carrier wave modulated pulses and operatively connected to said second oscillator in such a manner that the repetition rate of said pulses is equal to the instantaneous frequency of the output of said second oscillator.

3. A radar signal generator as recited in claim 2 wherein said pulse generator means comprises a step recovery diode.

4. A radar code signal generator as recited in claim 2 wherein said pulse generator means comprises: a tank circuit which has a resonant frequency at the frequency of said carrier wave; and a step recovery diode which is connected in series between the output of said second oscillator and said tank circuit.

5. A pulse modulated radar system comprising:
a. a signal code generator as recited in claim 2,
b. signal delay means having output means and operatively connected to said signal code generator to impress a preselected time delay upon a portion of the signals produced by said generator;
c. antenna means for radiating into space signals produced in said signal code generator and for receiving reflections thereof;
d. correlator means operatively connected to said output means of said signal delay means and to said antenna means to produce an output indicative of the correlation between the signals appearing at said signal delay output means and the reflected signals received by said antenna means;
e. indicator means for producing an indication when the output of said correlator is a maximum.

6. A device as recited in claim 5 wherein the output of said correlator is a maximum when the time delay induced by said signal delay means is equal to the time interval between radiation of said signal code generator output signal and reception at said antenna means of the reflected version thereof.

* * * * *